Patented Nov. 1, 1949

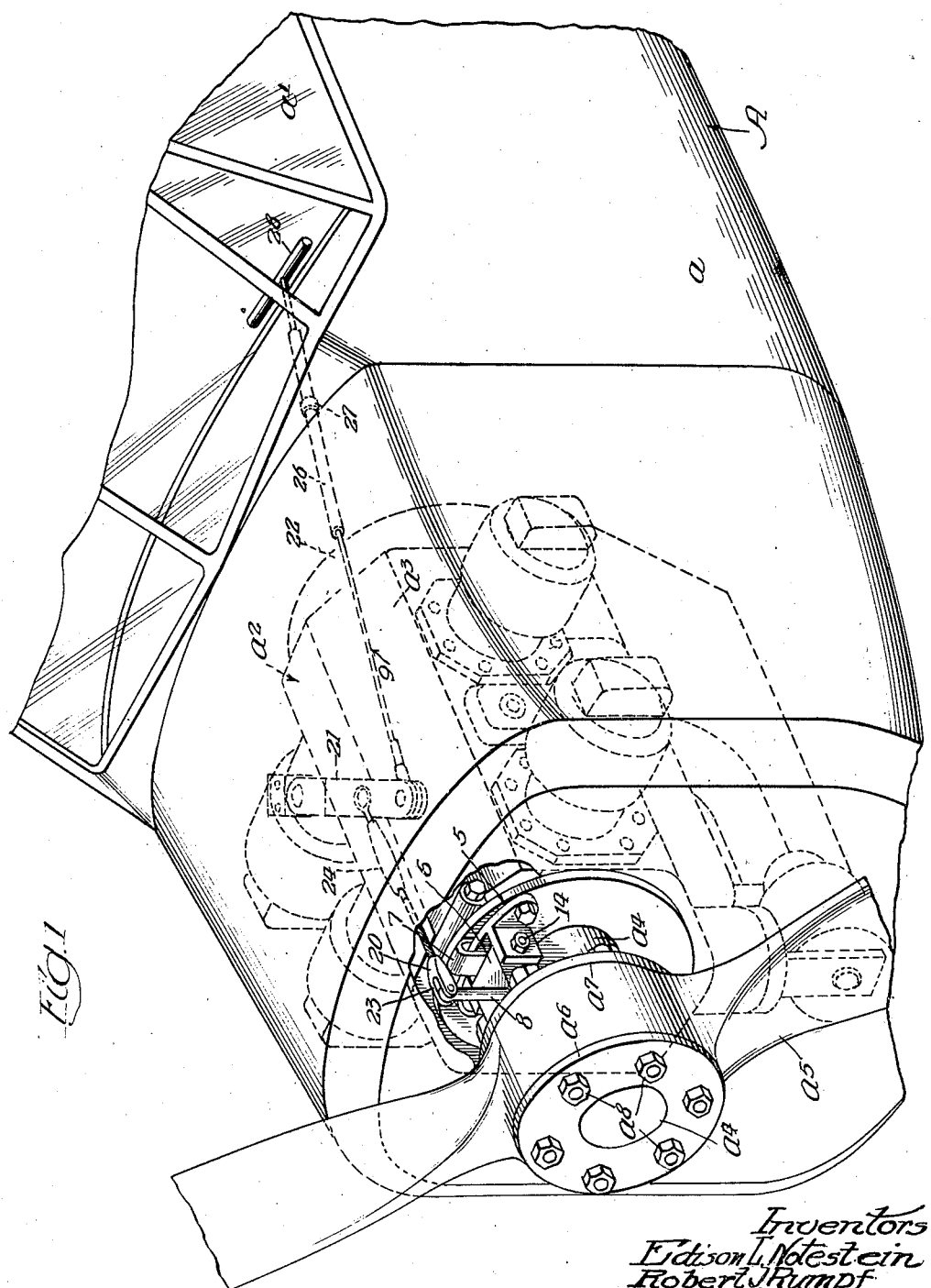

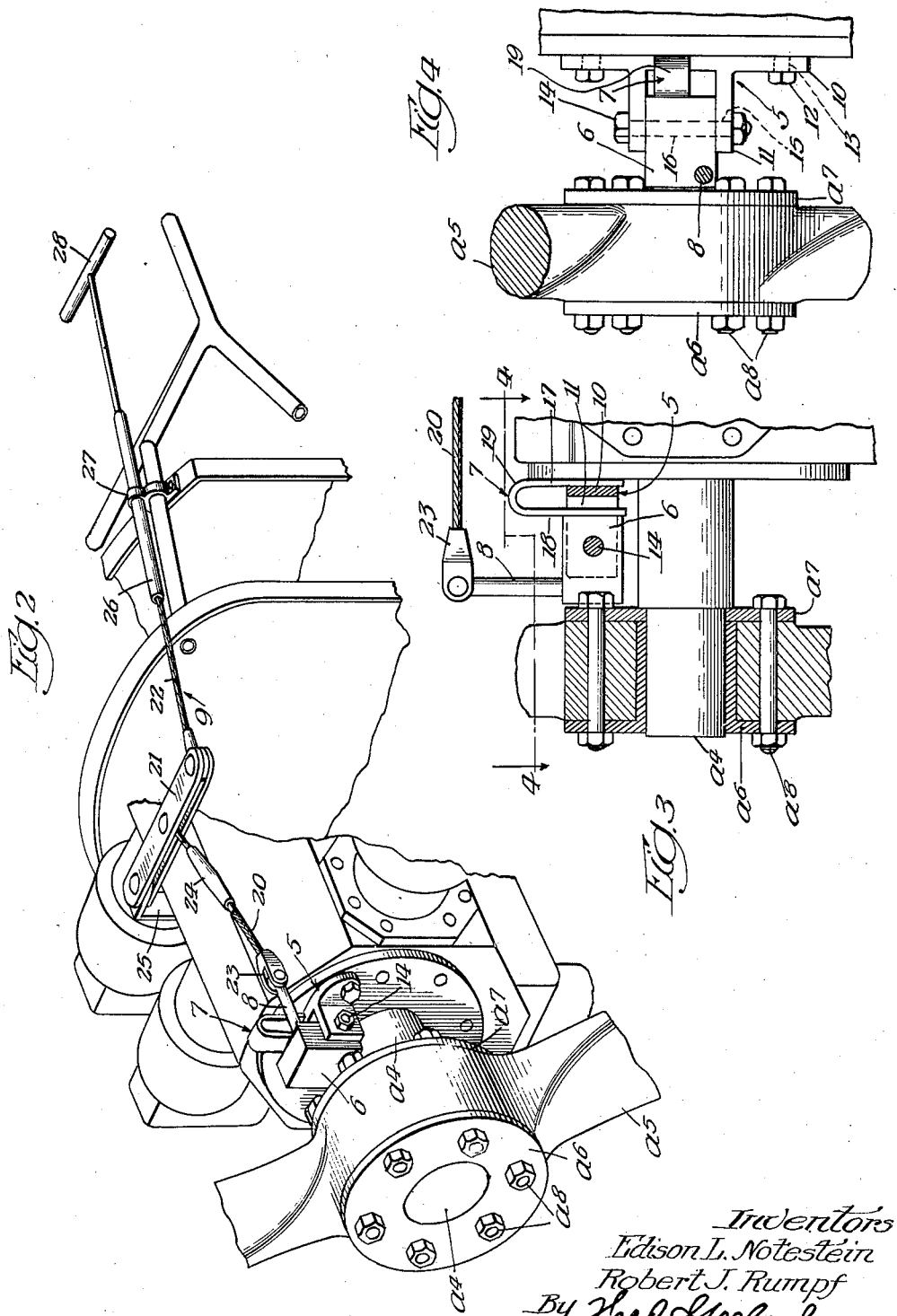

2,486,672

UNITED STATES PATENT OFFICE 2,486,672

AIRPLANE PROPELLER LOCKING MECHANISM

Edison L. Notestein, Wayne, and Robert J. Rumpf, Dearborn, Mich., assignors to Consolidated Vultee Aircraft Corporation, San Diego, Calif., a corporation of Delaware Application January 15, 1945, Serial No. 572,841

4 Claims. (Cl. 170—135.75)

The present invention relates generally to locking mechanism. More particularly the invention relates to that type of locking mechanism which is expressly designed for use in connection with an airplane and serves as a medium or instrumentality for locking the propeller of the airplane against rotation or so-called windmilling while the airplane is being towed in the air by a tow airplane.

One object of the invention is to provide an airplane propeller locking mechanism of this type which is simpler and more efficient than previously designed locking mechanisms and is characterized by the fact that it is controllable at the will of the pilot of the airplane and hence the pilot may release the mechanism and start the propeller driving engine directly after release of the airplane from the tow airplane.

Another object of this invention is to provide an airplane locking mechanism of the type under consideration comprising a locking block which is located opposite the hub of the airplane propeller with which the mechanism is employed and is movably mounted so that is is shiftable back and forth between an operative position wherein it extends between the heads of two adjacent propeller hub bolts and hence locks the propeller against rotation in either direction and an inoperative position wherein it is clear of the propeller hub bolts and permits the propeller to rotate without obstruction.

Another object of the invention is to provide an airplane propeller locking mechanism of the last mentioned character which embodies spring means for yieldingly holding the locking bolt in its operative and inoperative positions.

A further object of the invention is to provide an airplane propeller locking mechanism of the aforementioned character in which the locking block is shiftable into its inoperative position by means of a release cable arrangement, one end of which is disposed in the pilot's compartment of the airplane in order that it is subject to manipulation by the pilot.

A still further object of the invention is to provide an airplane propeller locking mechanism which is generally of new and improved construction, effectively and efficiently fulfills its intended purpose and consists of such a small number of parts that it may be produced at a low cost and is light in weight.

Other objects of the invention and the various advantages and characteristics of the present airplane propeller locking mechanism will be apparent from a consideration of the following detailed description.

The invention consists in the several novel features which are hereinafter set forth and are more particularly defined by the claims at the conclusion hereof.

In the drawings which accompany and form a part of this specification or disclosure and in which like letters and numerals of reference denote corresponding parts throughout the several views:

Figure 1 is a fragmentary perspective of a single engine tractor type airplane having applied thereto a propeller locking mechanism embodying the invention, the locking block of the mechanism being shown in its operative position wherein it extends between the heads of two adjacent propeller hub bolts and locks the propeller against rotation or so-called windmilling;

Figure 2 is a similar fragmentary perspective showing the locking block of the locking mechanism in its inoperative position wherein it is disposed rearwards of the propeller hub bolts and permits the propeller to rotate freely;

Figure 3 is an enlarged vertical section of the locking block and its supporting bracket, illustrating in detail the construction, arrangement and design of the spring means for yieldingly holding the block in its operative and inoperative positions; and Figure 4 is a section on the line 4—4 of Figure 3.

The locking mechanism which is shown in the drawings constitutes the preferred form of the invention and is illustrated in connection with a conventional or standard tractor type airplane A. The latter comprises a wing equipped fuselage $a$ having an enclosed pilot's compartment $a^1$ in its front central portion. The front end of the fuselage $a$ is in the form of a cowl which serves to encase or house an engine $a^2$ of the opposed cylinder type. The engine embodies a horizontally extending crankcase $a^3$ and has a crankshaft $a^4$ the front end of which projects through the front wall of the crankcase and has mounted thereon a propeller $a^5$. The latter is illustrated in the drawing as being of the two-bladed variety and has the hub thereof fixedly connected to the exposed front end of the crankshaft by way of front and rear discs $a^6$ and $a^7$ on the crankshaft and an annular series of $a^8$. As shown in the drawing, the hub of the propeller is interposed between the front and rear discs $a^6$ and $a^7$, and the rear disc is located a small distance forwards of the front end wall of the engine crankcase $a^3$. The propeller hub bolts $a^8$ extend through aligned holes in the discs $a^6$ and $a^7$ and the propeller hub and are positioned so that the heads thereof are adjacent the rear disc $a^7$. The subject locking mechanism serves as a medium or instrumentality for locking the propeller $a^5$ of the airplane A against rotation or windmilling while the airplane is being towed in the air by a tow airplane (not shown). It is contemplated that the airplane A may be towed by a towing mechanism like that disclosed in and forming the subject matter of Patent No. 2,443,114. As its principal parts or components the locking mechanism comprises a bracket 5, a locking block 6, a spring 7, an arm 8 and a cable arrangement 9.

The bracket 5 comprises a flat horizontally elongated attaching plate 10 and a pair of forwardly extending ears 11 and is mounted on the front end wall of the engine crankcase $a^3$ in opposed relation with the upper portion of the rear disc $a^7$ on the front end of the engine crankshaft $a^4$. The attaching plate 5 fits flatly against the front end wall of the crankcase and is fixedly secured in place by a pair of cap screws 12, the shanks of which extend through holes 13 in the ends of the attaching plate 5 and fit within screw threaded sockets in the front end wall of the engine crankcase. The ears 11 of the bracket 5 are spaced laterally apart. They are located directly inwards of the holes 12 in the ends of the attaching plate and are preferably formed integrally with said attaching plate.

The locking block 6 fits between the forwardly extending ears 11 of the attaching bracket 5 and is pivotally supported by a pivot bolt 14 so that it is free to swing back and forth between an operative position wherein it extends forwards and is located between the heads of two adjacent propeller hub bolts $a^8$ and an inoperative position wherein it extends upwards and is free or clear of the propeller hub bolts. The pivot bolt 14 comprises a shank which extends through axially aligned holes 15 in the outer ends of the ears 11 and through a coaxial hole 16 in what may be termed the rear portion of the locking block. The locking block is so arranged that when it is in its operative position wherein it extends forwards and horizontally the end faces thereof are interposed between and in abutment with the heads of the two adacent propeller hub bolts and the rear face is in spaced relation with the front face of the attaching plate 10 of the bracket 5. When it is desired to release the propeller after the airplane A has been disconnected from the tow airplane the locking block 6 is swung upwards and rearwards into its inoperative position wherein, as previously pointed out, it extends upwards and is clear of the propeller hub bolts $a^8$.

The spring 7 is of the leaf spring variety and serves yieldingly to hold the locking block 6 in its operative and inoperative positions. It is associated with the bracket 5 and consists of a vertically extending rear leg 17, a vertically extending front leg 18 and an inverted U-shaped connecting loop 19 between the upper ends of the two legs. The lower end of the rear leg 17 of the spring 7 is clamped between the central portion of the attaching plate 10 and the adjacent portion of the front end wall of the engine crankcase $a^3$. The lower end of the front leg 18 is interposed between the front face of the attaching plate 10 and the rear portion of the locking block 6 and is free in order that the front leg is permitted to flex bodily to and from the rear leg. When the locking block 6 is in its operative position the front leg 18 of the spring abuts against, and engages with spring pressure, the rear or back face of the locking block and holds the locking block in its operative position. In connection with the initial upward swinging movement of the locking block into its inoperative position the front leg of the spring is deflected rearwards by the upper rear corner of the locking block. After the locking block has been swung upwards into a position wherein it is at an angle in excess of 45 degrees with respect to the horizontal, the front leg of the spring springs outwards and causes the locking block to swing into its complete or full inoperative position with a snap action.

The arm 8 is connected to the front portion of the locking block 6 so that it extends upwards or vertically when the locking block is in its operative or propeller locking position. It is located at one side of the spring 7 and together with the cable arrangement 9 forms a means whereby the pilot for the airplane A may swing the locking block 6 upwards and rearwards into its inoperative position.

The cable arrangement 9 comprises a rearwardly extending cable 20, a force multiplying lever 21 at the rear end of the cable 20, and a cable 22 leading rearwards from the lever 21. The front end of the cable 20 is connected to the outer end of the arm 8 by a clevis 23 and the rear end of the cable 20 is connected to the central portion of the lever 21 by a turnbuckle 24. As shown in Figures 1 and 2, the cable 20 extends rearwards within the engine cowl on the front end of the airplane fuselage $a$. The lever 21 is essentially a second class lever and is positioned horizontally over the central portion of the top wall of the engine crankcase $a^3$. One end of the lever is pivotally connected to a bracket 25 on the top wall of the engine crankcase in order that the lever is free to swing horizontally. The front end of the cable 22 is anchored to the other end of the lever 21 and the central portion of the cable 22 extends through and is slidably mounted in a guide tube 26 which extends through an aperture in the instrument panel in the pilot's compartment and is connected by a bracket 27 to one of the longerons of the fuselage. The rear end of the cable 22 projects beyond the rear end of the guide tube 26, is located within the pilot's compartment $a^1$ and has a handle 28. When the handle 28 is pulled rearwards by the pilot of the airplane A the cable arrangement 9 operates through the medium of the arm 8 to swing the locking block 6 upwards and rearwards into its inoperative position.

When it is desired to use the locking mechanism in connection with flight towing of the airplane A the locking block 6 prior to towing of the airplane A is swung forwards into its operative position wherein it extends horizontally between the heads of two adjacent propeller hub bolts $a^8$. In connection with swinging of the locking block into its operative position the arm 8 swings upwards and the cable arrangement 9 is shifted forwards. When the airplane A has been towed to the desired extent the pilot of the airplane disconnects the towing mechanism and thereafter pulls rearwards on the handle 28 in order to cause the cable arrangement and the arm 8 to swing the locking block upwards into its inoperative position wherein it extends vertically and clears the propeller hub bolts $a^8$. As soon as the locking block is in its inoperative position the propeller is free and the engine $a^2$ may be started in order to effect forward propulsion of the airplane A.

The herein described airplane propeller locking mechanism effectively and efficiently fulfills its intended purpose and is characterized by the fact that it consists of but a small number of parts and hence is light in weight and may be produced at a low cost. It is essentially simple so far as design or construction is concerned and is under the control of the pilot of the airplane with which it is associated. By reason of the fact that the cable arrangement 9 includes the cables 20 and 22, the pilot of the airplane A can not shift or swing the locking block into its operative position by shifting forwards the handle 28 at the rear end of the cable 22. In other words, the pilot of the airplane A can only shift the locking block into its inoperative position, and while the airplane is in flight the locking block can not be swung into its operative position from the pilot's compartment $a^1$.

The invention is not to be understood as restricted to the details set forth since these may be modified within the scope of the appended claims without departing from the spirit and scope of the invention.

Having thus described the invention what we claim as new and desire to secure by Letters Patent is:

1. A mechanism designed for use in connection with an airplane having a pilot's compartment and in addition a propeller with a concentric annular series of spaced apart axially extending attaching bolts extending through, and projecting beyond on side of its hub, adapted to lock the propeller against rotation, and comprising a locking block positioned on the airplane opposite the said one side of the propeller hub and movably mounted so that it is shiftable back and forth between an operative position wherein it extends between two adjacent bolts and coacts therewith positively, to lock the propeller against rotation in either direction and an inoperative position wherein it is clear of the bolts and permits the propeller to rotate without obstruction, and means manipulatable from the pilot's compartment of the airplane for shifting the locking block into its inoperative position.

2. A mechanism designed for use in connection with an airplane having a pilot's compartment therein and an engine driven propeller ahead of the pilot's compartment and with a concentric annular series of equidistantly spaced axially extending attaching bolts extending through, and projecting beyond one side of its hub, adapted to lock the propeller against rotation during towing of the airplane, and comprising a locking block disposed opposite said one side of the propeller hub and movably mounted so that it is shiftable back and forth between an operative position wherein it extends between two adjacent bolts and hence coacts therewith positively to lock the propeller against rotation in either direction and an inoperative position wherein it is clear of the bolts and permits the propeller to rotate without obstruction, and means for shifting the locking block only into its inoperative position including a cable arrangement leading rearwards from the locking block into the pilot's compartment.

3. A mechanism designed for use in connection with a tractor type airplane having a pilot's compartment and an engine driven propeller ahead of the pilot's compartment and with a concentric annular series of equidistantly spaced axially extending attaching bolts extending through, and projecting beyond the rear face of its hub, adapted to lock the propeller against rotation during towing of the airplane in the air, and comprising a locking block mounted on the engine opposite said one side of the propeller hub provided with a rigid laterally extending arm, and pivotally supported so as to swing back and forth between an operative position wherein it extends between two adjacent bolts and coacts therewith positively to lock the propeller against rotation in either direction and an inoperative position wherein it is clear of the bolts and permits the propeller to rotate without obstruction, and a cable arrangement connected to the outer end of the arm, leading rearwards into the pilot's compartment, and arranged and designed so that when it is retracted it coacts with the arm to swing the locking block into its inoperative position.

4. A mechanism designed for use in connection with a tractor type airplane having a pilot's compartment and an engine driven propeller ahead of the pilot's compartment and with a concentric annular series of equidistantly spaced axially extending attaching bolts extending through, and projecting beyond the rear face of its hub, adapted to lock the propeller against rotation during towing of the airplane in the air, and comprising a bracket mounted on the engine adjacent said one side of the propeller hub, a locking block provided with a rigid laterally extending arm and pivotally connected to the bracket so as to swing back and forth between an operative position wherein it extends between two adjacent bolts and coacts therewith positively to lock the propeller against rotation in either direction and an inoperative position wherein it is clear of the bolts and permits the propeller to rotate without obstruction, spring means between the bracket and the locking block for yieldingly retaining said locking block in its operative and inoperative positions, and a cable arrangement connected to the outer end of the arm, leading rearwards into the pilot's compartment and arranged and designed so that when it is retracted it coacts with the arm to swing the locking block into its inoperative position.

EDISON L. NOTESTEIN.
ROBERT J. RUMPF.

REFERENCES CITED

The following references are of record in the file of this patent:

UNITED STATES PATENTS

| Number | Name | Date |
|---|---|---|
| 727,762 | Edgar | May 12, 1903 |
| 962,172 | Smith | June 21, 1910 |
| 1,388,642 | Haupt | Aug. 23, 1921 |
| 2,292,589 | Thomas | Aug. 11, 1942 |

FOREIGN PATENTS

| Number | Country | Date |
|---|---|---|
| 601,571 | France | Mar. 4, 1926 |